(12) United States Patent
Kung et al.

(10) Patent No.: US 9,728,773 B2
(45) Date of Patent: *Aug. 8, 2017

(54) ELECTRODE MATERIAL COMPRISING GRAPHENE-COMPOSITE MATERIALS IN A GRAPHITE NETWORK

(71) Applicant: Northwestern University, Evanston, IL (US)

(72) Inventors: Harold H. Kung, Wilmette, IL (US); Jung K. Lee, Seoul (KR)

(73) Assignee: NORTHWESTERN UNIVERSITY, Evanston, IL (US)

( * ) Notice: Subject to any disclaimer, the term of this patent is extended or adjusted under 35 U.S.C. 154(b) by 399 days.

This patent is subject to a terminal disclaimer.

(21) Appl. No.: 14/294,752

(22) Filed: Jun. 3, 2014

(65) Prior Publication Data
US 2014/0349191 A1 Nov. 27, 2014

Related U.S. Application Data

(63) Continuation of application No. 12/940,241, filed on Nov. 5, 2010, now Pat. No. 8,778,538.

(60) Provisional application No. 61/258,801, filed on Nov. 6, 2009.

(51) Int. Cl.
*H01M 4/36* (2006.01)
*H01B 1/18* (2006.01)
*H01M 4/134* (2010.01)
*H01M 4/1395* (2010.01)
*H01M 4/62* (2006.01)

(52) U.S. Cl.
CPC .............. *H01M 4/364* (2013.01); *H01B 1/18* (2013.01); *H01M 4/134* (2013.01); *H01M 4/1395* (2013.01); *H01M 4/625* (2013.01); *Y10T 29/49108* (2015.01); *Y10T 29/49115* (2015.01)

(58) Field of Classification Search
CPC ..................................................... H01M 4/366
See application file for complete search history.

(56) References Cited

U.S. PATENT DOCUMENTS

2003/0010631 A1* 1/2003 Anzai .................. H01M 4/364
204/293
2009/0117467 A1* 5/2009 Zhamu ................. H01M 4/133
429/231.8

* cited by examiner

*Primary Examiner* — Barbara Gilliam
*Assistant Examiner* — Stephan Essex
(74) *Attorney, Agent, or Firm* — The Marbury Law Group PLLC

(57) ABSTRACT

A durable electrode material suitable for use in Li ion batteries is provided. The material is comprised of a continuous network of graphite regions integrated with, and in good electrical contact with a composite comprising graphene sheets and an electrically active material, such as silicon, wherein the electrically active material is dispersed between, and supported by, the graphene sheets.

14 Claims, 7 Drawing Sheets

ELECTRODE MATERIAL COMPRISING GRAPHENE-COMPOSITE MATERIALS IN A GRAPHITE NETWORK

CROSS-REFERENCE TO RELATED APPLICATIONS

The present application is a continuation of U.S. patent application Ser. No. 12/940,241 that was filed Nov. 5, 2010, which claims priority from U.S. provisional patent application No. 61/258,801 that was filed Nov. 6, 2009, the entire contents of which are hereby incorporated by reference.

STATEMENT REGARDING FEDERALLY SPONSORED RESEARCH OR DEVELOPMENT

This invention was made with government support under DE-FG02-01ER15184 awarded by Department of Energy. The government has certain rights in the invention.

BACKGROUND

Rechargeable Li ion batteries have a wide range of applications. They are used to supply electricity to many portable electronic devices and hand-held tools, such as laptop computers, cell phones and other wireless communication devices, cordless electrical tools, and others. They can also be used in automobiles, trucks, airplanes, and other mobile devices either as the primary or sole power source, or as an auxiliary power source. An example is their use in hybrid vehicles and electric vehicles. Rechargeable batteries also can be used as a device to store electricity generated from intermittent sources, such as wind turbines or solar panels.

The performance of the Li ion battery is important in any of these applications. In general, the performance is measured by the charge density or storage capacity (how much electric charge can be stored per unit weight or volume), power density (rate of discharge per unit weight or volume), cycling durability (the number of charge-discharge cycles that can be repeated while maintaining the storage capacity and power delivery capability), and safety. The first three, namely storage capacity, power density, and cycling durability are determined primarily by the electrically active components of the battery.

The storage capacity, power density, and cycling stability depend strongly on the nature of the electrically active material (EA) and how it is supported and electrically connected to the current collector, which transfers electrons between the EA and the outside world. In a typical commercial Li ion battery, the negative electrode uses graphite powder as the EA, which is bonded together and to a metallic current collector with a binder. The maximum storage capacity of the graphite is determined by the chemical stoichiometry as one Li per six carbon atoms, giving a charge density of about 380 mAh/g of graphite. The storage capacity can be increased significantly using other EAs, such as Si, Sn, and many other elements as well as bimetallic or multimetallic mixtures. A major obstacle to the use of these alternative EAs is cycling stability. For example, the theoretical storage capacity of Si is about 10 times higher than graphite, but for negative electrodes made of silicon nanoparticles (e.g., particles of tens of nm diameter), the initial high capacity is lost after a few cycles to less than 10% of the theoretical capacity.

Silicon is often used as an example of an electrically active material, being an attractive candidate because it possesses the highest theoretical energy density among common elements, is cheap, and easy to handle. Various forms of Si electrode materials have been tested, including Si particles mixed with a binder and conducting carbon, nanowires, thin films, and 3-dimensional porous particles. (See, for example, B. A. Boukamp, G. C. Lesh and R. A. Huggins, J. Electrochem. Soc., 1981, 128, 725-729; B. Gao, S. Sinha, L. Fleming and O. Zhou, Advanced Materials, 2001, 13, 816-819; J.-K. Lee, M. C. Kung, L. Trahey, M. N. Missaghi and H. H. Kung, Chem. Mater., 2009, 21, 6-8; C. K. Chan, H. Peng, G. Liu, K. McIlwrath, X. F. Zhang, R. A. Huggins and Y. Cui, Nat. Nanotechnol., 2008, 3, 31-35; T. Takamura, M. Uehara, J. Suzuki, K. Sekine and K. Tamura, J. Power Sources, 2006, 158, 1401-1404; and H. Kim, B. Han, J. Choo and J. Cho, Angew. Chem., Int. Ed., 2008, 47, 10151-10154, S10151/10151-S10151/10153). However, these are still not satisfactory, either because of poor cycling stability, cost of manufacturing, and/or insufficient capacity improvement. Although the exact causes for storage capacity loss upon cycling are still under investigation, one contribution is fracturing of the Si structure consequent to the large volume changes upon lithiation/delithiation, resulting in loss of electrical contact of some Si fragments. Various attempts to stabilize these structures have been reported. The most common approach is to encapsulate the Si structure with a conducting carbonaceous layer, in hope that this would better retain the Si fragments from being disconnected from the conducting electrode. Various precursors can be used for encapsulation, including resorcinol-formaldehyde gel, poly(vinyl chloride)-co-vinyl acetate or polyvinyl chloride and chlorinated polyethylene, glucose, and fullerene $C_{60}$. (See, for example, J. K. Lee, M. C. Kung, L. Trahey, M. N. Missaghi and H. H. Kung, Chem. Mater., 2009, 21, 6-8; Y. Liu, Z. Y. Wen, X. Y. Wang, X. L. Yang, A. Hirano, N. Imanishi and Y. Takeda, J. Power Sources, 2009, 189, 480-484; Q. Si, K. Hanai, N. Imanishi, M. Kubo, A. Hirano, Y. Takeda and O. Yamamoto, J. Power Sources, 2009, 189, 761-765; Y. S. Hu, R. Demir-Cakan, M. M. Titirici, J. O. Muller, R. Schlogl, M. Antonietti and J. Maier, Angewandte Chemie-International Edition, 2008, 47, 1645-1649; and A. A. Arie, J. O. Song and J. K. Lee, Mater. Chem. Phys., 2009, 113, 249-254). Noticeable improvements were achieved, but capacity degradation was not eliminated.

In many of the engineered structures examined, such as nanowires and thin films, Si and other high capacity materials exhibit storage capacities that are near the theoretical value. However, the need to maintain electric conductivity with the current collector limits their dimensions to hundreds of nanometers. Furthermore, these structures typically require a metallic current collector as support, the weight of which significantly lowers the overall electrode storage capacity of the electrode assembly.

BRIEF SUMMARY

Electrode materials, electrodes made from the materials, batteries incorporating the electrodes, and methods for making the electrode materials are provided.

In the present electrodes, high capacity EA particles (or EA thin films) can be finely dispersed in (deposited on) a light-weight, electrically conducting, mechanically sturdy matrix that is sufficiently flexible to accommodate volume changes of the EA during use, and which can form a self-supporting electrode structure without the need for binders or additional current conductors that add weight to the electrode while contributing minimally to the storage capacity.

Electrodes that exhibit high storage capacities and good cycling stability can be prepared starting with graphene sheets, derived from low cost graphite and using a simple, easily scalable procedure in which an electrically active material, in the form of nanoparticles and/or thin films, are dispersed in, or deposited on, a graphene composite, and a portion of the graphene sheets is subsequently reconstituted into graphite to form a continuous, highly conducting network that also serves as a structural scaffold to anchor the graphene sheets that sandwich and trap the active material nanoparticles and/or thin films.

A schematic of a structure of one embodiment of an electrode material is shown in FIG. 6. This structure includes a graphite network and a composite comprising particles of an electrically active material dispersed between graphene sheets, wherein the composite is integrated into the graphite network to form an integral structure. As shown in the figure, the graphite network can be a continuous 3-dimensional network of graphite regions 602, supporting and connected to the composite material 604, where the graphitic regions (i.e., the regions comprising the reconstituted graphite) are characterized by ordered layers of carbon and the composite regions are characterized by disordered (non-crystalline) layers of carbon (graphene). Suitable electrically active materials include electrically active nanoparticles (e.g., particles having an average size of no greater than about 100 nm), such as nanoparticles of silicon (Si), tin (Sn), germanium (Ge), gallium (Ga), their alloys and intermetallics, and lithium titanium oxide. The nanoparticles can have a variety of shapes, including, but not limited to, spherical, elliptical, rod-like, tube-like, rectangular, cubic, or irregular.

In other embodiments, the electrically active material is present in the electrode materials as thin, continuous or discontinuous, coatings (films) on the graphene in the composite region, the coatings having a thickness of, for example, 5 nm or less, 2 nm or less, or even 1 nm or less. Such thin coatings of the electrically active material can be used instead of, or in addition to, the nanoparticles of electrically active material.

Thus, one aspect of the invention provides an electrode material comprising a continuous network of crystalline graphite regions integrated with, and in electrical contact with, a composite comprising disordered graphene sheets and nanoparticles (or thin films) comprising an electrically active material, wherein the nanoparticles (or thin films) comprising the electrically active material are dispersed between (or coated on) the disordered graphene sheets.

Another aspect of the invention provides a lithium ion battery comprising a cathode, an anode and a non-aqueous electrolyte disposed between the cathode and the anode, wherein the anode comprises an electrode material comprising a continuous network of graphite regions integrated with, and in electrical contact with, a composite comprising disordered graphene sheets and nanoparticles (or thin films) comprising an electrically active material, wherein the nanoparticles (or thin films) comprising the electrically active material are dispersed between (or coated on) the disordered graphene sheets.

In some embodiments, the anode of the lithium ion battery has a lithium ion storage capacity of at least 1000 mAh/g, or even 2000 mAh/g, and experiences a decrease in lithium ion storage capacity of no greater than 1% per cycle over 50 lithiation/delithiation cycles.

Yet another aspect of the invention provides a method for making an electrode material, the method comprising: (a) mixing nanoparticles comprising an oxidized electrically active material with oxidized graphene sheets to form a silicon-graphene oxide composite material comprising the nanoparticles dispersed between disordered graphene sheets; and (b) thermally reducing the silicon-graphene oxide composite material such that some of the disordered graphene sheets form regions of crystalline graphite, thereby forming an electrode material comprising a continuous network of graphite regions integrated with, and in electrical contact with, a composite comprising disordered graphene sheets and nanoparticles comprising an electrically active material, wherein the nanoparticles comprising the electrically active material are dispersed between the disordered graphene sheets.

The step of mixing the nanoparticles comprising an oxidized electrically active material with oxidized graphene sheets to form the silicon-graphene oxide composite material can be carried out by mixing an aqueous dispersion of the oxidized nanoparticles with an aqueous dispersion of the oxidized graphene sheets, sonicating the resulting mixture to form the silicon-graphene oxide composite material, and filtering off the water and allowing the silicon-graphene oxide composite material to dry.

In a variation of this aspect of the invention, the nanoparticles in step (a) can be replaced by (or augmented by) thin films of an electrically active material. Such thin films can be applied to the graphene sheets using, for example, chemical vapor deposition, plasma-enhanced chemical vapor deposition or magnetron sputtering. This variation of the method provides an electrode material comprising a continuous network of graphite regions integrated with, and in electrical contact with, a composite comprising disordered graphene sheets and thin films comprising an electrically active material, wherein the thin films comprising the electrically active material are disposed the disordered graphene sheets.

BRIEF DESCRIPTION OF THE DRAWINGS

FIG. 3(f) shows a reconstituted graphite phase composed of about 5-13 layers of graphene. FIG. 3(g) is an image of a crystalline Si nanoparticle, showing its atomic lattice. FIG. 3(h) is an edge view of a crushed SG composite fragment showing the layered structure of graphene and Si nanoparticles.

DETAILED DESCRIPTION

Figure 1:
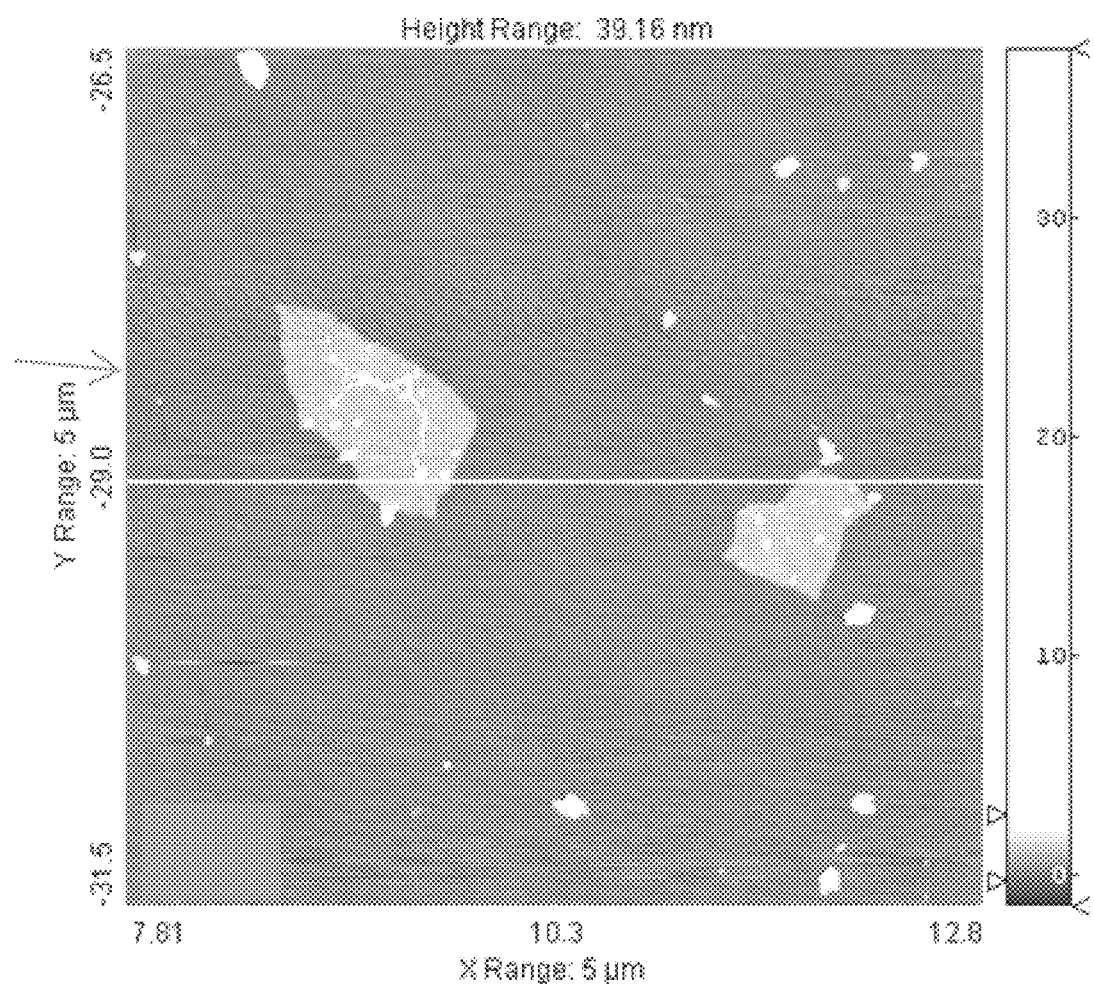
FIG. 1. AFM scan of two graphene oxide sheets, showing a single layer height of about 1 nm and a width of about 1×1 µm.

A durable electrode material suitable for use in Li ion batteries is provided. Methods of forming the electrode material are also provided. The material is comprised of a network of graphite regions that are in good electrical and physical contact with composite regions comprising a composite of graphene sheets and nanoparticles of an EA and/or thin films of an EA, wherein the EA nanoparticles and/or EA thin films are dispersed in, and supported by, the graphene sheets. The network of graphite regions is formed by reconstituting graphene sheets at the contact points of stacks of graphene sheets after the EA nanoparticles (or EA films) have been dispersed with (or deposited on) the graphene sheets. During the reconstitution process, highly dispersed EA nanoparticles (or EA films) are trapped between the graphene sheets within the composite regions of the material.

Unlike previous composites of graphene sheets and EA materials, the present materials provide a continuous network of graphite regions, formed from reconstituted graphene stacks in a graphene sheet-EA composite. Such a structure offers the combined advantages of the high electrical conductivity and the structural stability of graphite with the flexibility of graphene sheets, and the high Li ion storage capacity of the EA material. As shown for the embodiment depicted in FIG. 6 and FIG. 3, the network of graphite is continuous because continuous sheets of graphene extend through the graphite regions and the graphene-EA nanoparticle composite to form an integral structure. Such a structure is distinguishable from a non-continuous structure wherein EA nanoparticles are located within pores between graphite flakes, graphite worms or graphite platelets.

The graphite regions that are made from stacks of graphene sheets, are electrically conducting, mechanically strong, and easy to prepare from exfoliated graphite. They possess limited Li storage capacities, consistent with carbon-based materials. Since they can be made from a low cost starting material and the preparation process is inexpensive and readily scalable, they are well-suited as supports for high-storage capacity materials.

In the graphene sheet-EA composite regions, the flexibility of the graphene sheets makes it much easier for the material to accommodate volume changes of the EA material during the charging and discharging cycle. The extremely high surface area of the graphene sheets provides a large number of contact points with the EA material and, thus, the ability to maintain electrical contact even when the EA material undergoes morphological changes and/or agglomeration or fracturing during cycling, thus effectively overcoming one of the principal causes of performance degradation (capacity fading). The network of graphite regions in the present materials provides an excellent electrical conductivity path and a structurally robust scaffold to support the graphene-EA composite. By forming the graphite network directly from graphene-EA composites at points where graphene sheets are in contact with each other, such that the network of graphite regions and the graphene-EA composite forms one integral piece, the high electrical conductivity across the graphene-graphite interface and the structural support of the graphite network are ensured.

Any suitable EA materials for the negative and positive electrode can be used, such as Si, Sn, or other monometallic, bimetallic, or multimetallic materials, or oxidic or sulfide materials, or their mixtures. If silicon is chosen as the electrically active material, typical loadings for the silicon in the electrode materials are in the range of about 30 wt. % to about 80 wt. %. For example, in some embodiments the electrode materials comprise about 50 wt. % to about 70 wt. % silicon. This includes embodiments in which the electrode materials comprise about 55 to about 65 wt. % silicon.

Electrodes made from the present materials are typically no greater than 50 μm thick. This includes embodiments of the electrodes that are no greater than 15 μm thick and further includes embodiments of the electrodes that are no greater than 5 μm thick.

Electrodes made with the present electrode materials can provide a lithium ion storage capacity of at least 1000 mAh/g. This includes embodiments of the electrodes that provide storage capacities of at least 1500 mAh/g and further includes embodiments of the electrodes that provide storage capacities of at least 2000 mAh/g. In addition, the electrodes can provide very good cycling stability. Thus, some embodiments of the electrodes experience a decrease in lithium ion storage capacity of no more than 1% per cycle over 50 cycles. This includes embodiments of the electrodes that experience a decrease in lithium ion storage capacity of no more than 0.5% per cycle over 50 cycles (or even over 200 cycles) and further includes embodiments of the electrodes that experience a decrease in lithium ion storage capacity of no more than 0.2% per cycle over 50 cycles.

An additional advantage of the present materials is the low cost of graphene sheets and the ease of manufacturing of the graphene sheet-EA composite-graphite network assembly. A third component can be added advantageously to the EA-graphene composite. Such third component can include a polymer or a carbonized form of polymer that can assist in dispersing the EA material and stabilizing against agglomeration or other chemical degradation.

Li ion batteries incorporating the present electrode materials are also provided. The batteries include a cathode, an anode and a non-aqueous electrolyte disposed between the cathode and the anode. The anode comprises the above-described electrode material comprised of a network of graphite regions that are in good electrical and physical contact with a composite of graphene sheets and an EA material supported by the graphene sheets.

EXAMPLE

This example demonstrates stable performance in maintaining storage capacity against fading with cycling of graphite network/graphene-silicon nanoparticles composites for the Li ion negative electrode. This example describes composites of Si nanoparticles highly dispersed between graphene sheets, and supported by a 3-D network of graphite regions formed by reconstituting regions of graphene stacks. An electrode with a storage capacity higher than 2200 mAh/g that decreased by 0.16% or less per cycle after 50 cycles, and by 0.5% or less per cycle after 200 cycles, was prepared.

Preparation of Graphite Oxide:

Graphite oxide (GO) was synthesized from flake graphite (Asbury Carbons, 230U Grade, High Carbon Natural Graphite 99+) by a modified Hummers method originally reported by Kovtyukhova et al. (N. I. Kovtyukhova, P. J. Ollivier, B. R. Martin, T. E. Mallouk, S. A. Chizhik, E. V. Buzaneva and A. D. Gorchinskiy, *Chem. Mater.*, 1999, 11, 771-778), in which pre-oxidation of graphite is followed by oxidation with Hummers' method. In the pre-oxidation, the graphite power (2.0 g) was added with stirring into a concentrated $H_2SO_4$ (20 mL) solution in which $K_2S_2O_8$ (1.0 g) and $P_2O_5$ (1.0 g) were completely dissolved at 80° C. The mixture, in a beaker, was kept at 80° C. for 4.5 h using an oil bath, after which the mixture was cooled down and diluted with 1 L of distilled deionized (DDI) water. The pretreated product was filtered with a nylon membrane filter (0.2 µm, Milipore) and washed on the filter until the pH of the filtrate water became neutral. The shiny, dark-gray, pre-oxidized graphite was dried in air overnight. Then it was dispersed by stirring into chilled $H_2SO_4$ (75 mL) in an Erlenmeyer flask in an ice bath. $KMnO_4$ (10 g) was added slowly with stirring to keep the temperature of reaction mixture below 20° C. The resulting thick, dark green paste was allowed to react at 35° C. for 2 h followed by addition of DDI water (160 mL) to give a dark brown solution. To avoid over-flow of the mixture due to rapid temperature rise with foaming by water addition, the flask was chilled in an ice bath and water was added in ~5 mL aliquots with close monitoring of the temperature (kept below 50° C.). After additional stirring for 2 h, the dark brownish solution was further diluted with distilled water (500 mL) after which $H_2O_2$ (30%, 8.3 mL) was added slowly and the color of the mixture turned into a brilliant yellow. The mixture was allowed to settle overnight and the supernatant was decanted. The remaining product was washed with 10% HCl solution (800 mL) with stirring and the brownish solution was allowed to settle overnight. The supernatant was decanted and the remaining product was centrifuged and washed with DDI water. The washing process was repeated until the pH of the solution became neutral (at this stage, the Mn concentration in the supernatant was below 0.1 ppm by atomic absorption spectroscopy (AAS)). The obtained product was diluted to make a ~0.7% w/w aqueous dispersion for storage.

Preparation of Silicon-Graphene Paper Composites:

In a typical preparation, Si nanoparticles (H-terminated, <30 nm, Meliorum Nanotechnology, stored in Ar) were removed from an argon glovebox and exposed to air overnight to ensure that a hydrophilic oxide layer was formed on the surface of the nanoparticles. Then the Si nanoparticles were weighed and dispersed in ~1 ml DDI water by sonication for 15 minutes. A desired amount of the graphite oxide dispersion was then added to the suspension of Si nanoparticles. In some preparations, the pH was adjusted to ~10 with $NH_4OH$ (29% in $H_2O$, Fischer Scientific), whereas in others, no pH adjustment was made. No clear trend on the effect of pH adjustment could be identified. The composite mixture was then sonicated for 60 minutes and vacuum-filtered (47 mm, 0.22 µm pore nylon filters, Whatman) until the surface of the composite appeared dry. The resulting material is referred to as a silicon-graphene oxide (SGO) composite paper. After filtering, the SGO composite paper was removed from the nylon filter carefully with forceps and allowed to air-dry for approximately 24 hours. Once dried, a razor blade was used to cut the SGO composite paper into smaller ribbons to allow them to fit into a quartz tube for thermal reduction. Samples for electrodes were cut from these ribbons either before or after thermal reduction, although the material was easier to cut prior to thermal reduction. SGO composite papers were reduced with a 10% $H_2$ in argon flow (~100 ml/min total rate) at 700° C. for 1 hour. Other reduction temperatures (e.g., 550 and 850° C.) and times could be used. Afterwards, the samples were ready for testing.

The SGO composite paper changed from amber and somewhat translucent to grey and opaque after reduction to form a "silicon-graphene paper" (or "silicon-graphene composite paper"). This silicon-graphene paper (or SG paper) is the material comprising a network of graphite regions that are in good electrical and physical contact with composite region comprising a composite of graphene sheets and nanoparticles of an EA, wherein the EA nanoparticles are dispersed in, and supported by, the graphene sheets. This material was more brittle than the SGO material, but was still flexible and could be cut with a metal cutter into circular disks for electrochemical testing. The weight % (wt. %) of Si was determined by weight loss due to combustion of the graphene in a thermogravimetric analysis apparatus. In some cases, the SG composite paper was crushed and mixed with a binder to form an electrode.

Sample Characterization:

X-ray diffraction (Rigaku X-ray diffractometer miniflex) measurements were carried out with Cu $K_\alpha$ radiation using an operating voltage of 40 kV, a step size of 0.01°, and a step time of 1 s. High-resolution transmission electron microscopy (HRTEM) was performed on a Hitachi HF-2000 operated at 200 kV with a energy dispersive spectroscopy (EDS) detector. Samples dispersed in ethanol were applied onto a 400 mesh Cu grid with lacey carbon film and dried in air before TEM imaging. For thermogravimetric analysis (TGA) (Mettler Toledo, TGA/SDTA851$^e$) in air, the samples were heated to 100° C. and held at 100° C. for 10 min to remove any volatiles and water adsorbed on the samples. Then, the temperature was ramped to 800° C. at the rate of 10° C./min in flowing air. The weight loss, after correcting for oxidation of Si, was used to calculate the carbon content. Separate TGA with bare silicon nanoparticle was run at the same conditions to obtain data to correct the weight gain of Si-graphene composite papers due to oxidation of silicon particles in air. For atomic force microscopy (AFM) images of graphene oxide sheets, a droplet of the dilute, aqueous dispersion was dried onto a freshly cleaved mica surface at room temperature with an $N_2$ purge. A normal tapping mode silicon cantilever (125 kHz, 16 N/m, SI-DF20, Seiko Nano Instruments Inc.) was used for AFM imaging. An AFM instrument (Nanoscope IV, Digital Instrument, Santa Barbara, USA) was used for surface imaging. The dispersion and size distribution of graphene oxide sheets dispersed in water (0.25 mg/mL) were measured with dynamic light scattering (DLS) at 25° C. Scanning Electron Microscopy (SEM) images were taken with a Hitachi S-3400N-II microscope operated at 5 kV accelerating voltage in the secondary electron (SE) mode. Sheet resistance and conductivity measurements were made with a four-point probe technique with an electrode separation of 1 mm using a Keithley 2400 source meter.

The electrochemical response of the samples was tested using two-electrode Swagelok-type cells, with a Li metal reference electrode that was separate from a Li metal counter electrode. For the Si-graphene composite paper samples, the sample was weighed ten consecutive times on an analytical balance (Mettler Toledo AX205) to enhance accuracy. These samples were typically ~2 mg/cm$^2$ and 5-30 µm thick. They were placed directly on stainless steel plungers in the Swagelok-type cells. For the crushed samples, the working electrode was prepared with mixtures of 90.0 wt. % active materials and 10.0 wt. % poly(vinylidene fluoride) (PVDF, binder, Sigma-Aldrich) using a 5.0 wt. % PVDF solution in N-methyl-2-pyrollidone (NMP, 99.5%, anhydrous, Sigma-Aldrich) exclusive of any conductive additive. The working electrode mixture was pasted onto a Cu foil (99.999%, 0.025 mm thick, Alfa-Aesar). Subsequently, the coated electrodes were dried in a vacuum oven at 75° C. overnight. The typical active material loading of the electrode was ~1-3 mg/cm$^2$ and its thickness was ~30-50 m. A 1.0M LiPF$_6$ in EC/DMC 1/1 (v/v) solution soaked on a microporous membrane (Celgard 2325) separator was used as the electrolyte, and lithium foil (99.9%, 0.75 mm thick, Alfa-Aesar) was used as the counter electrode. The cell was assembled in an argon-filled glove box.

Figure 2:
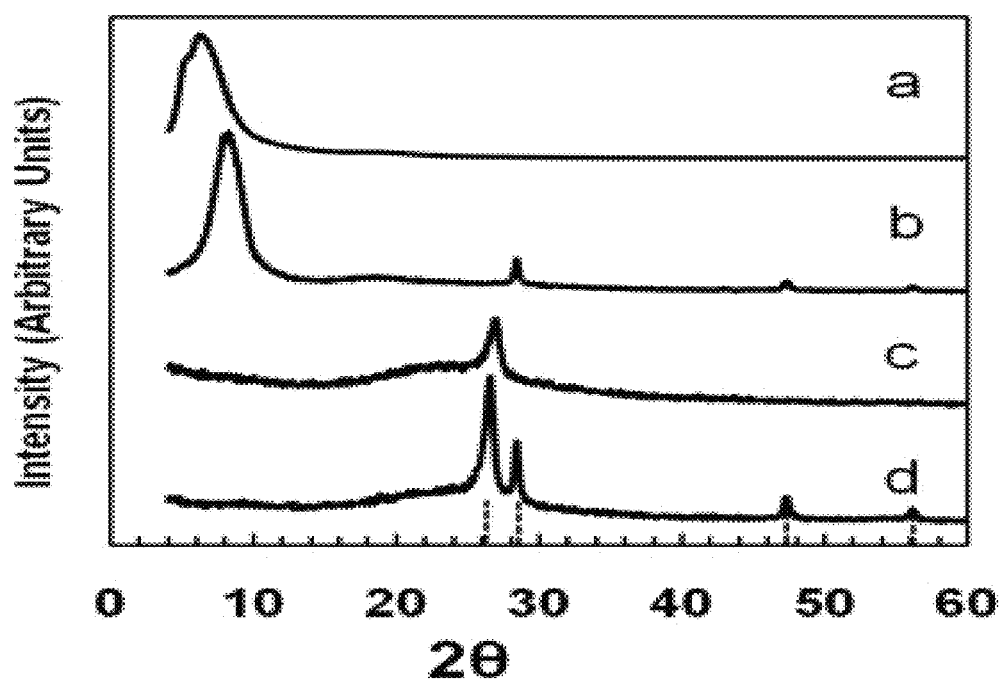
FIG. 2. X-ray diffraction patterns of: (a) graphene oxide paper; (b) silicon-graphene oxide (SGO) paper; (c) graphene paper formed by the reduction of graphene oxide (GO) paper; (d) silicon-graphene (SG) paper formed by the reduction of SGO paper. Diffractions due to graphite (26.4°) and Si (111), (220), and (311) at 28.3°, 47.2°, and 56.1°, respectively, are indicated.

Results:

A dried graphene oxide paper without Si nanoparticles showed a strong, broad x-ray diffraction peak at 6-10° 2θ (~10 Å d-spacing). A similar intense peak at 8-10° 2θ was observed for a sample containing ~60 wt. % Si (FIG. 2 curves a and b). These values are consistent with reported interlayer spacing for graphene. (See, for example, D. A. Dikin, S. Stankovich, E. J. Zimney, R. D. Piner, G. H. B. Dommett, G. Evmenenko, S. T. Nguyen and R. S. Ruoff, *Nature* (London, U. K.), 2007, 448, 457-460). For a SGO sample, peaks corresponding to (111), (220), and (311) diffractions of Si were also observed, suggesting that as prepared, the Si nanoparticles remained mostly in the metallic state. After reduction in H$_2$ to form a SG sample, the low-angle diffraction peak of interlayer spacing disappeared, while a peak appeared at about 26.4° on top of a broad hump, indicating the presence of both crystalline and disordered graphite phases (FIG. 2 curves c and d). The Si diffractions were still clearly observed, and, from the line width of the (220) diffraction, the Si particles were estimated to have an average diameter of 21-22 nm, suggesting little particle coarsening.

Figure 7:
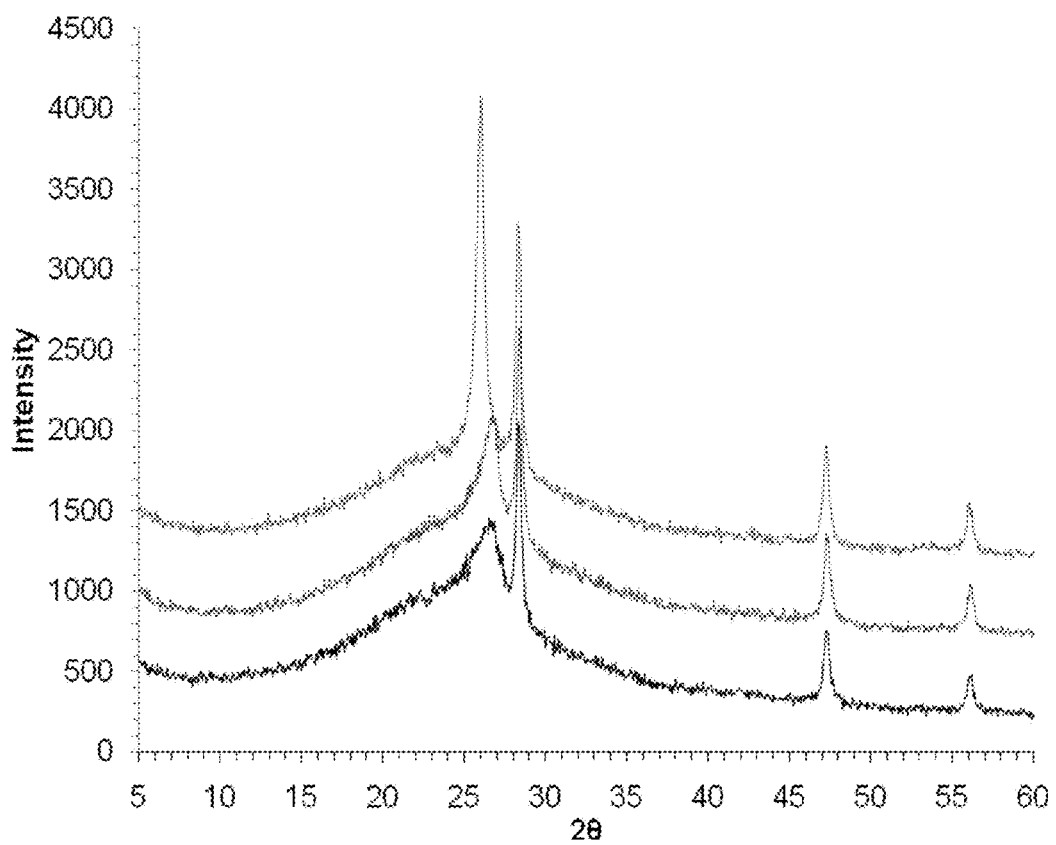
FIG. 7 shows XRD spectra of SG composites reduced at 550° C. (top), 700° C. (middle), and 850° C. (bottom).

The thermal reduction temperature and time significantly affected the extent of graphite reconstitution in SG samples (FIG. 7) and their conductivity. The conductivities were 13.1, 18.7, 33.1 S/cm for SG samples reduced at 550, 700, and 850° C., respectively, versus $6.8 \times 10^{31}$ S/cm for an unreduced SGO paper. The resistivities were 0.076, 0.053 and 0.030 (Ω·cm) for SG samples reduced at 550, 700, and 850° C., respectively, versus 146 (Ω·cm) for an unreduced SGO paper. The corresponding sheet resistances were 153, 107, 60, and $2.9 \times 10^5$ Ω for the three SG samples and the SGO sample. The average size of the reconstituted graphite regions decreased as: 550>700>850° C. sample. The extent of reconstitution in the present materials can vary based on the processing conditions and the loading of the electrically active material. However, in some embodiments, reconstituted graphite makes no more than 50 percent (e.g., about 1 to 50 percent or about 5 to 40 percent) by weight of the carbon in the materials.

Figure 3:
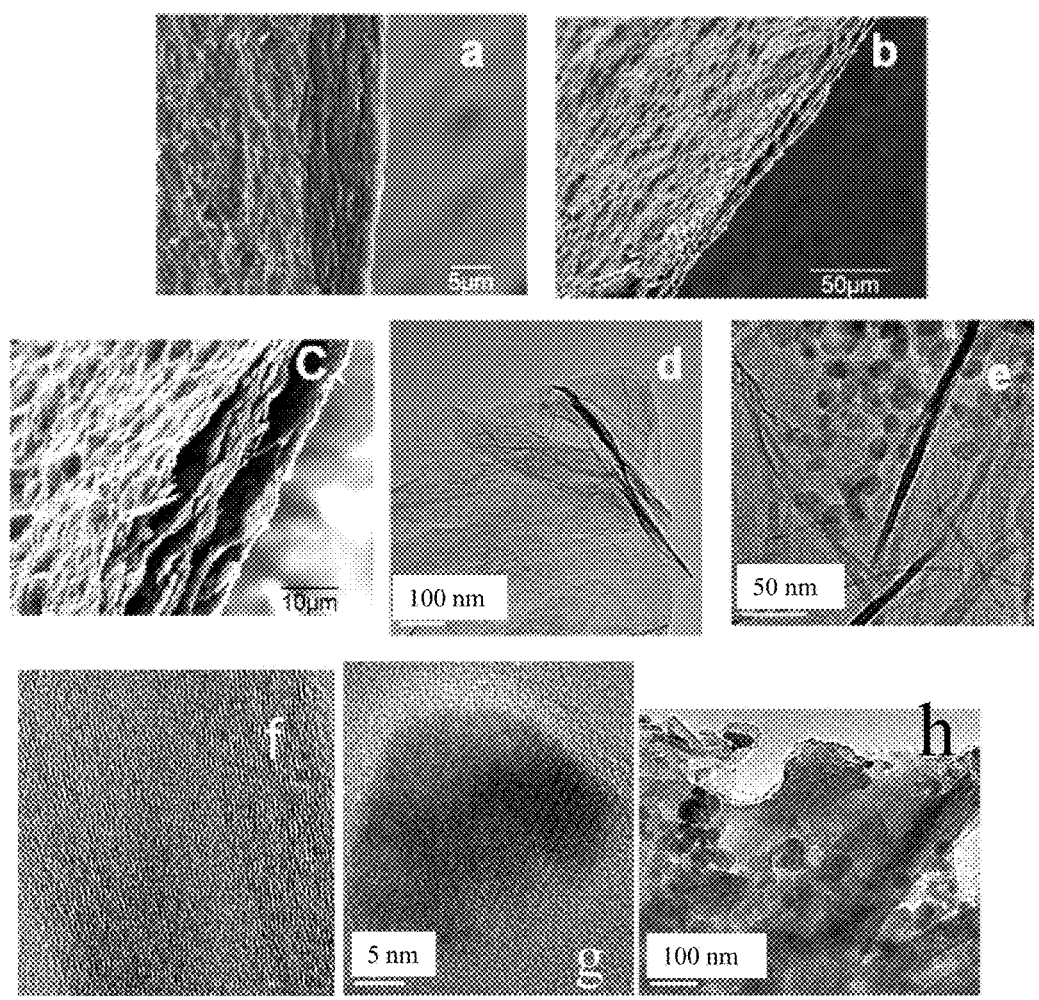
FIG. 3. Edge-view SEM images of: (a) SGO paper; (b) and (c) SG paper. TEM images of: (d) Graphene sheets, and (e) SG paper.

The SEM image of a SGO composite paper (FIG. 3(*a*)) showed a stack of graphene oxide sheets. After reduction, the sheets appeared more crumpled, and pockets of void space were clearly visible (FIGS. 3(*b*) and (*c*)). The physical thickness of the paper decreased upon reduction by about 8% for a sample without Si, and about 5, 3.5, and 3% for samples containing 30-40 wt. %, 58-60 wt. %, and 78 wt. % Si. The sheet-like morphology of graphene is also shown in the TEM images (FIG. 3(*d*)). FIG. 3(*e*) shows Si nanoparticles, 20-25 nm in diameter, dispersed on/between graphene sheets in a SG sample. FIG. 3(*f*) shows a reconstituted graphite phase composed of about 5-13 layers of graphene. FIG. 3(*g*) is an image of a crystalline Si nanoparticle, showing its atomic lattice. FIG. 3(*h*) is an edge view of a crushed SG composite fragment showing the layered structure of graphene and Si nanoparticles.

Figure 4:
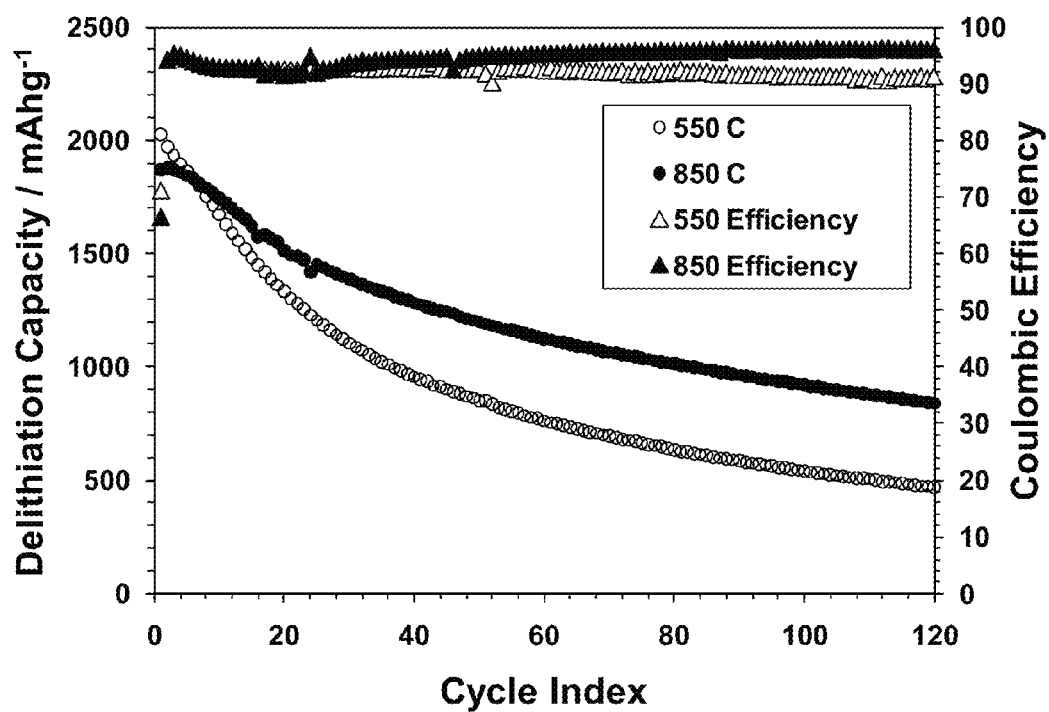
FIG. 4. Delithiation capacities and coulomb efficiencies of SG samples reduced at 550 or 850° C., using a constant current-constant voltage (CCCV) method (1.5-0.020V, 1000-50 mA/g).

The effect of conductivity (and graphite crystallinity) on the electrochemical behavior of the present materials was examined using two SG samples reduced at 550 or 850° C. The results (FIG. 4) show that the sample with a higher conductivity retained better charge capacity upon cycling. This is consistent the hypothesis that a sample with a higher conductivity would be more tolerant to Si particles fracturing and redepositing on other parts of the graphene surface.

Figure 5:
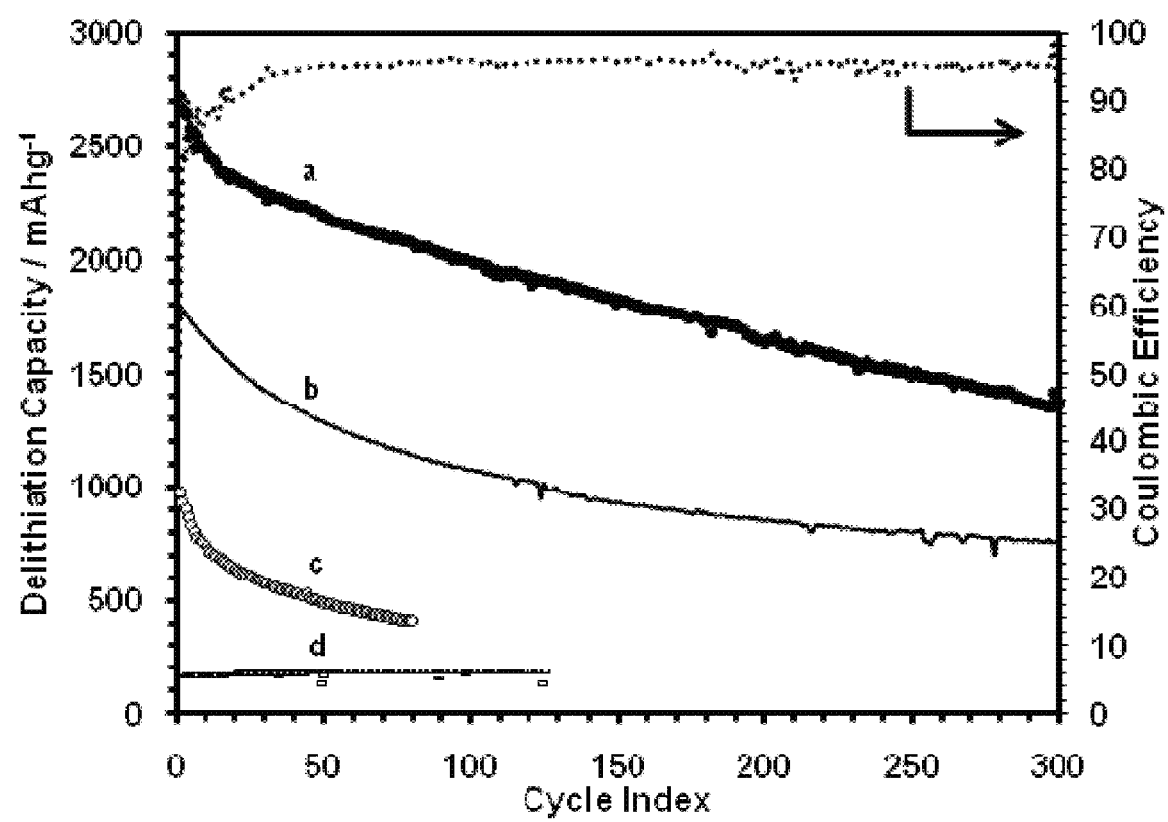
FIG. 5. Delithiation capacity of: (a) SG paper (sample 2 from the Examples), 61 wt. % Si; shown with coulombic efficiencies; (b) SG paper (sample 1 from the Examples), 59 wt. % Si; tested using the CCCV method (sample 1 from the Examples: 1.5-0.005 V, 1000-80 mA/g; sample 2 from the Examples: 1.5-0.02 V, 1000-50 mA/g); (c) SG paper (sample 1 from the Examples, crushed and mixed with a poly (vinylidene fluoride) (PVDF) binder, cycled at 100 mA/g constant current mode (2.0-0.02V); (d) Graphene-only sample cycled using the CCCV method.

The Li ion storage capacities of two SG samples containing ~60 wt. % Si are shown in FIG. 5. The Li ion storage capacities for the SG samples are much higher than the storage capacity of graphene alone (curve d, FIG. 5). Curves a and b are for two samples that differ in their thickness, being thinner (~4 μm) for sample 2 (curve a) than sample 1 (curve b, 15 μm). Sample 2 exhibited a very high storage capacity and stability, achieving >2200 mAh/g after 50 cycles and >1400 mAh/g after 300 cycles with a Li ion storage capacity degredation of 0.16% or less per cycle. Sample 1 exhibited a storage capacity of 1000 mAh/g after 100 cycles, and retained a storage capacity of 800 mAh/g after 290 cycles, and 560 mAh/g after 600 cycles. Since the storage capacity of these graphene papers without Si was about 200 mAh/g, most of the observed capacities were due to the Si nanoparticles. The cycling coulomb efficiency was >95% throughout the test for sample 1. For sample 2, the efficiency increased from ~80% initially to 98+% after ~30 cycles.

The low storage capacities and coulomb efficiencies in the first few cycles were probably due to the fact that the pores of the electrode were not completely wetted with electrolyte initially, such that some of the Si nanoparticles in the center were not utilized.

Other methods to prepare SG composite electrodes are also available, but may be less efficient. A number of samples were made by crushing a SG paper into small chunks after reduction and forming an electrode using a binder. The resulting material showed initial storage capacities around 1000 mAh/g and cycling stability similar to the paper composites, as illustrated in FIG. 5, curve d. The crushing process, mechanically broke down the continuous nature of the SG paper and eliminated the advantageous effects of physical confinement of the silicon nanoparticles and continuous connectivity of the 3-D network structure.

Figure 6:
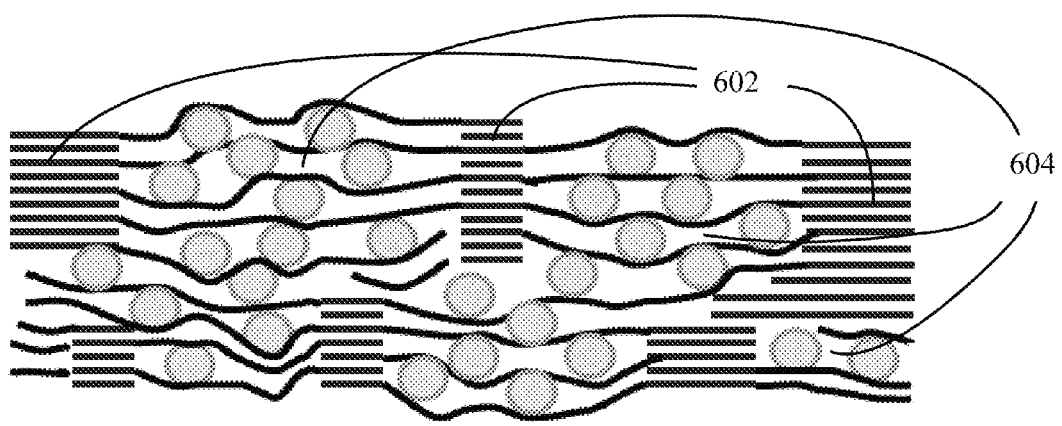
FIG. 6. Schematic drawing (not to scale) of a high-capacity, stable electrode, made of a 3-D network of graphite (lighter lines) anchoring regions of graphene-Si composite. Circles denote Si nanoparticles and darker lines graphene sheets. The graphite network is formed from regions of graphene sheet stacks; thus, the graphite and the graphene regions have similar number of sheets.

These results show that electrodes of high storage capacities and good cycling stability can be obtained from graphene-Si composites provided that the Si nanoparticles are well dispersed between the graphene sheets, and portions of the graphene sheet stacks are reconstituted to form a network of graphite regions within the material (FIG. 6). The network provides high electrical conductivity throughout the electrode and serves as a mechanically strong framework to anchor the more flexible graphene sheets in the graphene-EA composite that sandwich the Si nanoparticles. That the graphite is reconstituted from the graphene sheets ensures excellent electrical contact between the crystalline and non-crystalline regions of the material, as well as mechanical integrity of the junctions between regions within the material.

As used herein, and unless otherwise specified, "a" or "an" means "one or more." All patents, applications, references, and publications cited herein are incorporated by reference in their entirety to the same extent as if they were individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like includes the number recited and refers to ranges which can be subsequently broken down into subranges as discussed above. Finally, as will be understood by one skilled in the art, a range includes each individual member.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. An electrode material, comprising:
   network of graphitic regions; and
   composite regions disposed between the graphitic regions, the composite regions comprising graphene sheets and electrically active particles disposed between the graphene sheets,
   wherein at least some of the graphene sheets extend out of the composite regions and are integrated into graphite of the graphitic regions.

2. The electrode material of claim 1 wherein the electrically active particles comprise a material selected from the group consisting of silicon, tin, an oxide, a sulfide, a metallic material, and mixtures thereof.

3. The electrode material of claim 2 wherein the electrode material comprises between about 30 weight percent to about 80 weight percent of the electrically active particles.

4. The electrode material of claim 1 wherein the graphitic regions comprise graphite that has been reconstituted from graphene layers.

5. The electrode material of claim 1 wherein the electrode material has a thickness no greater than 50 μm.

6. An electrochemical cell, comprising:
   a first electrode comprising:
   a network of graphitic regions;
   composite regions disposed between the graphitic regions, the composite regions comprising graphene sheets and electrically active particles disposed between the graphene sheets;
   a second electrode spaced from the first electrode; and
   an electrolyte,
   wherein at least some of the graphene sheets extend out of composite regions and are integrated into graphite of the graphitic regions.

7. The electrochemical cell of claim 6 wherein the electrically active particles comprise a material selected from the group consisting of silicon, tin, an oxide, a sulfide, a metallic material, and mixtures thereof.

8. The electrochemical cell of claim 6 wherein the electrode material comprises between about 30 weight percent to about 80 weight percent of an electrically active material.

9. The electrochemical cell of claim 6 wherein the second electrode comprises lithium.

10. The electrochemical cell of claim 6 having a storage capacity of at least 1,000 mAh/g.

11. The electrochemical cell of claim 6 characterized as exhibiting a decrease in storage capacity no greater than 1% per cycle over 50 lithiation/delithiation cycles.

12. The electrochemical cell of claim 6 characterized as exhibiting a decrease in storage capacity no greater than 0.5% per cycle over 200 lithiation/delithiation cycles.

13. The electrode material of claim 1, wherein the network of graphitic regions comprises a three-dimensional network of electrically connected graphite.

14. The electrochemical cell of claim 6, wherein the network of graphitic regions comprises a three-dimensional network of electrically connected graphite.

* * * * *